United States Patent [19]
Honjo

[11] Patent Number: 5,432,769
[45] Date of Patent: Jul. 11, 1995

[54] APPARATUS FOR INTERMITTENTLY RECORDING OR REPRODUCING VARIABLE LENGTH CODED VIDEO DATA

[75] Inventor: Masahiro Honjo, Sakai, Japan

[73] Assignee: Matsushita Electric Industrial Co., Ltd., Osaka, Japan

[21] Appl. No.: 870,635

[22] Filed: Apr. 20, 1993

[30] Foreign Application Priority Data

Apr. 18, 1991 [JP] Japan ................................. 3-086958

[51] Int. Cl.⁶ ............................................. G11B 7/00
[52] U.S. Cl. .......................................: 369/60; 369/59; 369/58; 369/48
[58] Field of Search ...................... 369/60, 59, 58, 47, 369/48, 54, 124, 116; 360/51

[56] References Cited

U.S. PATENT DOCUMENTS 4,862,295  8/1989  Tanaka et al. ................... 369/59
4,872,073  10/1989  Fincher et al. ................... 360/51

*Primary Examiner*—Georgia Y. Epps
*Assistant Examiner*—Muhammad Edun
*Attorney, Agent, or Firm*—Wenderoth, Lind & Ponack

[57] ABSTRACT

In a recording and/or reproducing apparatus, digital video data to be recorded is temporarily stored in a buffer, and when the amount of data being stored in the buffer exceeds a predetermined value, the data is recorded on a recording medium for a constant period of time, and when the amount of data is less than the predetermined value, the data is intermittently recorded onto the next track of the recording medium. When being reproduced, the reproduced data is stored in the buffer temporarily so as to be decoded gradually, and when the amount of data being stored in the buffer is smaller than a predetermined value, the information is reproduced from the recording medium for a constant period of time, and when it exceeds the predetermined value, the information is intermittently are produced from the next track. As a result, the recording and reproducing can be carried out in accordance with the amount of data, so that it becomes effectively possible that for an image signal having a small amount of data, the recording and reproduction for an extremely long period of time can be carried out and in case of an image signal having a large amount of data, the recording and reproduction with a high image quality can be carried out.

4 Claims, 3 Drawing Sheets

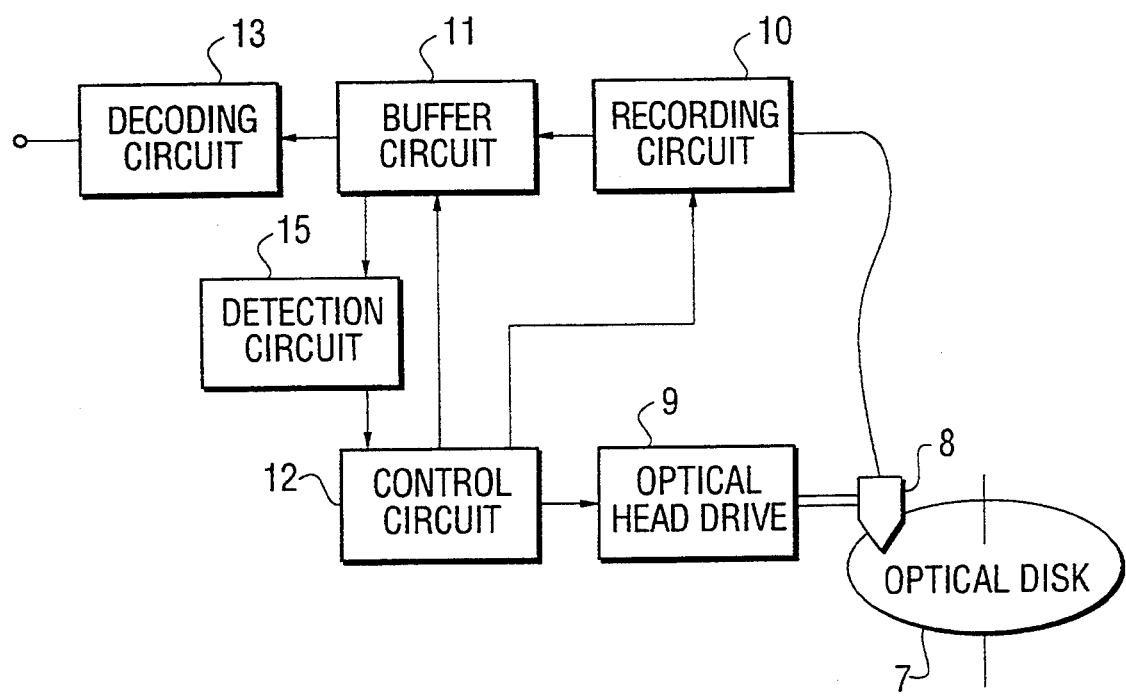

APPARATUS FOR INTERMITTENTLY RECORDING OR REPRODUCING VARIABLE LENGTH CODED VIDEO DATA

TITLE OF THE INVENTION

Apparatus for intermittently recording or reproducing variable length coded video data

BACKGROUND OF THE INVENTION

1. Field of the Invention

This invention related to a recording and/or reproducing apparatus to be used with an optical disk or the like in which an information including a video signal which has been bandwidth-compressed in a variable length coding manner is recorded on or reproduced from the optical disk or the like.

2. Description of the Prior Art

Apparatus in which a video signal has been digitized and encoded and then recorded on a recording medium are very wellknown. In this case, however, such an apparatus has a so-called fixed-length coding in which a video signal is processed so that the amount of data to be generated in one field or one frame or for a time period of one second becomes constant. This is because in a recording medium (magnetic tape or optical disk), the rotation of either a cylinder having a rotational head, or a disk must be synchronized with the period of the video signal in any form (for example, one turn for one frame), so that the amount of data in a predetermined period is constant, which means that the fixed-length coding is best adapted in such apparatus.

Considered from the viewpoint of improving the bandwidth compression, variable length coding is far superior in efficiency to fixed-length coding.

However, it has previously been considered difficult to record or reproduce information encoded on a tape or optical disk by variable length coding because of the fact that the rotational speed of the cylinder or the optical disk must be controlled in accordance with the amount of code.

SUMMARY OF THE INVENTION

An object of this invention is to provide a recording and/or reproducing apparatus which codes a video signal in a bandwidth compression manner.

When the video signal is to be recorded, the information to be recorded is stored in a buffer circuit temporarily, and if the amount of information being stored in the buffer circuit exceeds a predetermined value, the information is recorded on a recording medium for a constant period of time, and if the amount of information thus stored thereinto has not attained a predetermined amount, the information is intermittently recorded on the next track thereof.

When it is to be reproduced, the reproduced information is stored in a buffer circuit temporarily to be decoded gradually, and when the amount of information being stored in the buffer circuit has not attained a predetermined value, the information is reproduced from the recording medium for a constant period of time, and if the amount of information thus stored thereinto exceeds the predetermined value, the information is intermittently reproduced therefrom.

Accordingly, when the amount of information to be recorded or reproduced is large, the information is recorded on or reproduced from the next track of the recording medium in a successive manner, and when the amount of information to be recorded or reproduced is small, the information is not recorded or reproduced, and when the amount of information is increased, the next track is scanned again to re-start the recording or reproducing operation, which means that the recording or reproducing operation can be carried out in accordance with the amount of information that the video signal has.

Consequently, the recording and/or reproducing apparatus of this invention is very effective in that in case of a small amount of information as in an image whose movement is small, the recording and reproducing operation for an extremely long period of time becomes possible, and in case of a large amount of information as in an image whose movement is larger, the time period of recording and reproducing operation becomes short without degrading the image quality.

BRIEF DESCRIPTION OF THE DRAWINGS

FIG. 4 is a block diagram of a reproducing system of a recording and/or reproducing apparatus of this invention.

DESCRIPTION OF THE PREFERRED EMBODIMENTS

Figure 1:
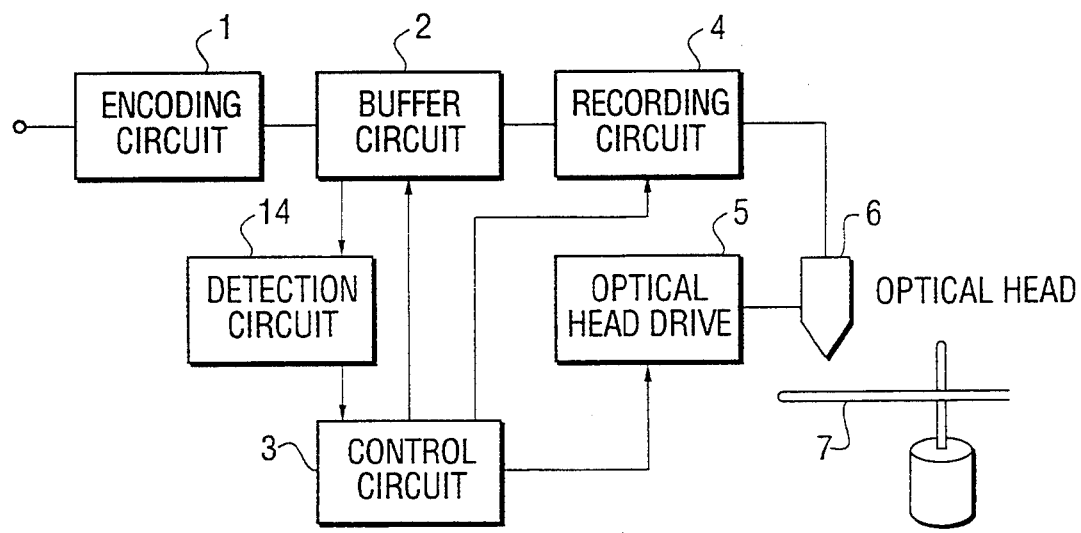
FIG. 1 is a block diagram of a recording system of a recording and/or reproducing apparatus of this invention.

FIG. 1 is a block diagram of a recording and/or reproducing apparatus according to one embodiment of this invention. This recording and/or reproducing apparatus comprises an encoding circuit 1 for variable length encoding each frame of a continuous video signal in a bandwidth compression manner to obtain blocks of variable length coded video data, a buffer circuit 2 for storing the coded video data from the encoding circuit 1 temporarily, a recording circuit 4 for converting the encoded video data readout from the buffer circuit 2 into a recording signal, an optical head 6 for recording the recording signal on a recording medium 7, an optical head driving circuit 5 for driving the optical head 6, a detection circuit 14 for detecting the amount of coded video data being stored in the buffer circuit 2, and a control circuit 3 for controlling the buffer circuit 2, recording circuit 4 and optical head driving circuit 5 in response to an output signal from the detection circuit 14.

In FIG. 1, if the detection circuit 14 detects that the amount of coded video data stored in the buffer circuit 2 exceeds a predetermined value, the stored data is read out from the buffer circuit 2 and is recorded on the recording medium 7 for a constant period of time. Thereafter, if the amount of coded video data stored in the buffer circuit 2 is smaller than the predetermined value, the stored data is not read out and not recorded but rather the circuit waits for the amount of stored data to exceed the predetermined value. Here, the detection circuit 14 may detect the stored amount of data by comparing, for example, the writing address and reading address of a memory of the buffer circuit 2.

Figure 2A:
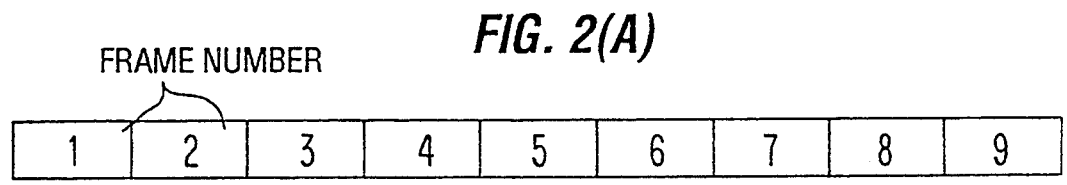
FIGS. 2(A)–2(E) are timing diagrams of the apparatus shown in FIG. 1.
Figure 2B:
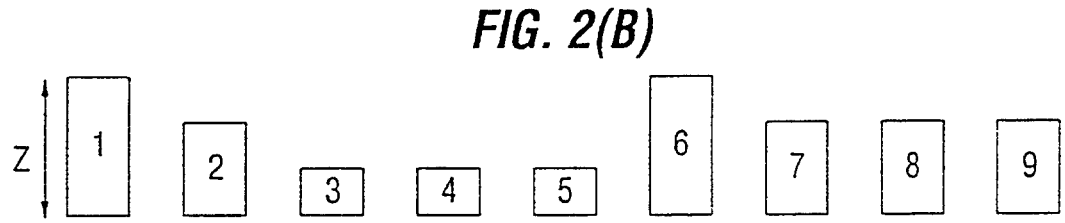

The operation of recording the variable length coded video data disk will be exemplified below by referring to FIGS. 2(A)-2(E). FIG. 2(A) shows continuously occurring frames of an inputted signal and their frame numbers, and FIG. 2(B) shows blocks of variable length coded video data obtained by subjecting the frames shown in FIG. 2(A) to the bandwidth compression variable length encoding. In FIGS. 2(A)-2(B), the blocks of variable length coded video data corresponding to frames 1 and 6 have relatively large amount of data and the blocks of variable length coded video data corresponding to frames 3, 4 and 5 have relatively small amounts of data. The amount of data which can be recorded onto one track of a disk is predetermined, being expressed as Z. This corresponds to a block of variable length coded video data having the largest amount of data to be recorded.

Figure 2C:
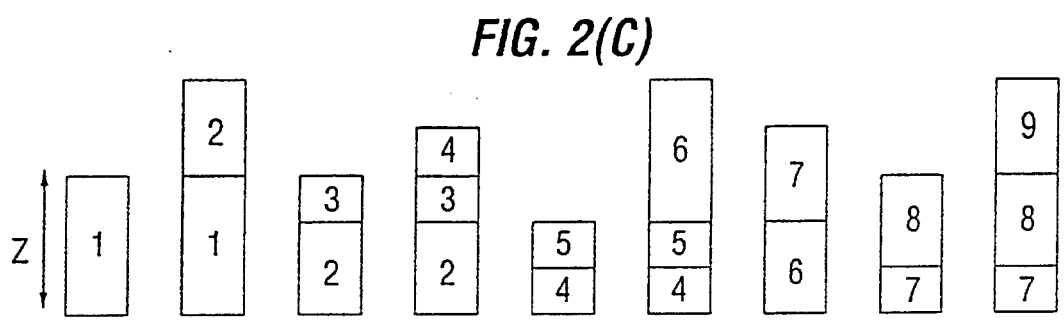

Each block of variable length coded data is stored in the buffer circuit temporarily, and when the amount of data stored in the buffer circuit exceeds a predetermined value, for example, Z, the data in the buffer circuit is recorded on the next track. The amounts of data stored in the buffer circuit are shown in FIG. 2(C), and the data to be read out from the buffer circuit and recorded on the disk and their timings are shown in FIG. 2(D).

Figure 3:
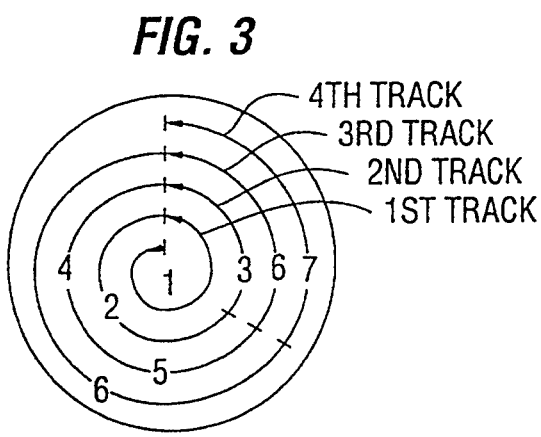
FIG. 3 is a disk pattern diagram of the apparatus shown in FIG. 1.

In recording the blocks of variable length coded video data of a video signal on the optical disk, the data of the block corresponding to frame 1 is recorded on a first track, the data of the blocks corresponding to frame 2 and frame 3 are recorded on a second track, the data of the blocks corresponding to frame 4 and frame 5 and the part of the data of the block corresponding to frame 6 are recorded on a third track, and the other part of the data of the block corresponding to frame 6 and a part of a frame 7 are recorded on a fourth track 4, which is shown in FIG. 3.

In order to record the video information as noted above, such. that when the amount of coded video data stored in the buffer circuit 2 exceeds the amount of data Z for one track, the stored data is read out and is recorded on the next track.

Figure 2D:
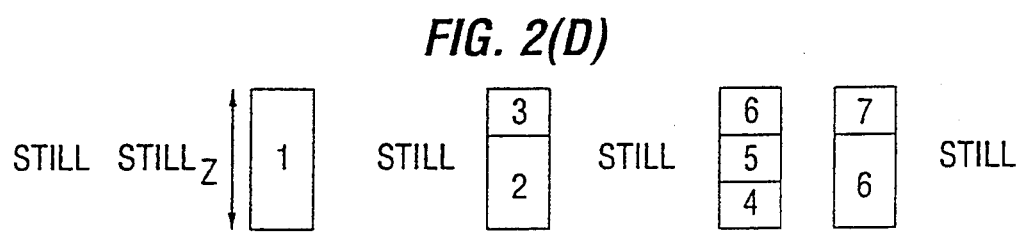
Figure 2E:

For this, the control circuit 3 controls the recording circuit 4 and optical head driving circuit 5 so that intermission of recording (still), track renewal and information recording can be performed at the timing as shown in FIG. 2(D).

The buffer circuit 2 may have, for example, the capacity for storing the amount of data needed for two tracks (that is, 2Z) and when the data exceeding the amount needed for one track (z) is stored, the data having the amount of data needed for one track (Z) may be recorded.

Next, the reproduction of information data stored on a disk as shown in FIG. 3 will be explained below.

FIG. 4 is a block diagram of the reproducing system of a recording and/or reproducing apparatus of this embodiment, which comprises an optical head circuit 8 for reproducing variable length coded video data which has been recorded in the form of a recorded signal on a recording medium, a reproducing circuit 10 for converting the reproduced data from the optical head circuit 8 into blocks of variable length coded video data, a buffer circuit 11 for temporarily storing the variable length coded video data from the reproducing circuit 10, a decoding circuit 12 for bandwidth compression decoding variable length coded video data read out from the buffer circuit 11 to obtain a reproduced video signal, an optical head driving circuit 9 for driving the optical head circuit 8, a detection circuit 15 for detecting the amount of data which has been stored in the buffer circuit 11, and a control circuit 12 for controlling the buffer circuit 11, recording circuit 10, and optical head driving circuit 9 in response to an output from the detection circuit 15.

In FIG. 4, the reproduced variable length coded video data from optical head circuit 8 is stored temporarily in the buffer circuit 11, and then, decoded gradually in the decoding circuit 13. At that time, the detection circuit 15 detects the amount of data which has been stored in the buffer circuit 11. When the amount of stored data in the buffer circuit 11 is smaller than a predetermined value, the data recorded on the recording medium is reproduced and stored in the buffer circuit for a constant period of time. When the amount of data which has been stored in the buffer circuit 11 is larger than the predetermined value, the data reproduction from the recording medium and the data storing in the buffer circuit 11 are stopped until the amount of data in the buffer circuit 11 is smaller than the predetermined value.

Here, the detection circuit 15, for example, may compare the writing address and reading address of a memory of the buffer circuit 11 to detect the amount of data stored in the buffer circuit 11.

Figure 5A:
FIGS. 5(A)–5(C) are timing diagrams of the apparatus shown in FIG. 4.
Figure 5B:
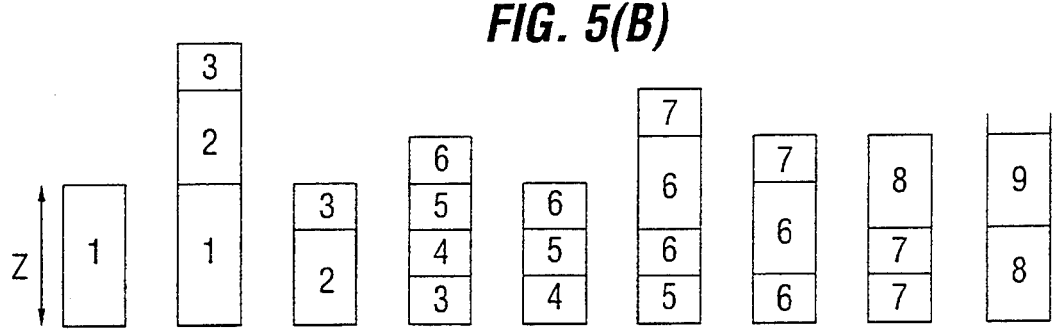
Figure 5C:
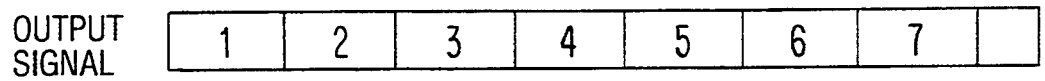

In case of reproducing the video data as shown in FIG. 3, the reproduction is carried out in an intermittent feeding manner as shown in FIGS. 5(A)-5(C). FIG. 5(A) shows the data obtained from one track and the interval of the stills, and FIG. 5(B) shows the data stored in the buffer circuit 11. In this case, the buffer circuit 11 has an amount of data therein which is equal to about two tracks (that is, twice the amount of data Z). When the reproduced data exceeding the one track amount of data Z remains in the buffer circuit 11, the reproduction is stopped, and when the amount of data in the buffer circuit 11 becomes smaller than the amount of data Z, the reproduction is carried out for the next one track. As a result, the reproduction will be carried out in such an intermittent feeding manner that is shown in FIGS. 5(A)-5(C). Here, it is clear that frames decoded by the decoding circuit 13 are continuously outputted as shown in FIG. 5(C).

In this case, the reproducing operation may be controlled such that variable length coded video data of one or two frames after the frame being decoded is always stored in the buffer circuit 11.

As explained above, with the optical disk apparatus of this invention, and maximum transfer rate to and from the recording medium may be determined to transfer a block of variable length coded video data having a maximum amount of data. When the amount of data is small, the recording or reproducing operation is stilled for a predetermined period of time, for example, one track scanning time interval for waiting. As a result, in a case when a small amount of data such as data of an image whose movement is less, for example, is to be reproduced, the reproduction is carried out in an intermittent feeding manner in which the still is to be carried out largely, resulting in a vase increase in the time capable of recording onto and reproducing from the disk.

In addition, in a case when a large amount of data such as data of an image whose movement is greater, for example, is to be processed, a high transfer rate can be realized by recording onto and reproducing from the track in a successive manner, thus making possible for no degradation of the image quality to occur.

Furthermore, the abovenoted control method of recording and/or reproducing was carried out when the amount of information stored in the buffer circuit reached a predetermined value; however, the predetermined value may be changed adaptively in accordance with the radius of the disk.

This embodiment is described with respect to an optical disk,, but is not limited thereto, and can be applied to a magnetic disk and a video tape recorder (VCR). In the case of using a VCR, the control is made so that a tape is fed by a capstan intermittently in one track unit while the rotational period of a cylinder is kept substantially constant, thus making possible for a highly efficient recording and reproduction to be carried out on a variable length coding basis similar to the case explained above. In this case, it is preferable that a rotational head is disposed on a piezoelectric: device, and errors generated by the inertia or the like developed when the tape is fed by the capstan are compensated for by driving the piezoelectric device.

I claim:

1. A video signal recording apparatus comprising:
   an encoder for variable length encoding an input video signal in a bandwidth compression manner to obtain continuous blocks of variable length coded video data;
   a buffer for temporarily storing the blocks of variable length coded video data from said encoder;
   a recording device including a head for recording coded video data read out from said buffer on a recording medium; a head driver for driving said head;
   a detector for detecting whether or not the amount of coded video data which has been stored in said buffer exceeds a predetermined value; and
   a controller responsive to an output from said detector for controlling said buffer, said recording device and said head driver for selectively performing one of a first operation in which the coded video data stored in said buffer is read out from said buffer and recorded on said recording medium and a second operation in which the coded video data stored in said buffer remains therein and is not read out and not recorded on said recording medium, said controller performing said first operation for specific period of time when the amount of coded video data stored in said buffer exceeds said predetermined value and performing said second operation when the amount of coded video data stored in said buffer is less than said predetermined value.

2. An apparatus according to claim 1 wherein said recording medium is an optical disk and said head is an optical head, and wherein said head driver drives said optical head to perform a track jump to wait for next data in said second operation.

3. A video signal reproducing apparatus for reproducing a video signal which has been recorded on a recording medium in the form of blocks of variable length coded video data, said apparatus comprising;
   a reproducing device including a head for reproducing the variable length coded video data from the recording medium to obtain reproduced coded video data;
   a buffer for temporarily storing the reproduced coded video data from said reproducing device;
   a decoder for decoding coded video data read out from said buffer to obtain a reproduced video signal;
   a head driver for driving said head;
   a detector for detecting whether or not the amount of coded video data which has been stored in said buffer is smaller than a predetermined value; and
   a controller responsive to an output from said detector for controlling said buffer, said reproducing device and said head driver for selectively performing one of a first operation in which the variable length coded video data is reproduced from said recording medium and stored in said buffer and a second operation in which the variable length coded video data falls to be reproduced from said recording medium and is not stored in said buffer, said controller performing said first operation form a specific period of time when the amount of coded video data stored in said buffer is smaller than said predetermined value and performing said second operation when the amount of coded video data stored in said buffer is larger than said predetermined value.

4. An apparatus according to claim 3, wherein said recording medium is an optical disk and said head is an optical head, and wherein said head driver drives said optical head to perform a track jump to wait for reproduction of next data in said second operation.

* * * * *